United States Patent [19]

Kobayashi

[11] Patent Number: 4,477,351

[45] Date of Patent: Oct. 16, 1984

[54] FILTERING APPARATUS

[76] Inventor: Tomio Kobayashi, No. 5-21-9, Tsukagoshi, Warabi-shi, Saitama-ken, Japan

[21] Appl. No.: 525,975

[22] Filed: Aug. 24, 1983

[51] Int. Cl.³ ............................................. B01D 33/10
[52] U.S. Cl. .................................... 210/396; 210/402; 210/406
[58] Field of Search ............ 210/396, 402, 406, 416.1, 210/407

[56] References Cited

U.S. PATENT DOCUMENTS 1,385,341   7/1921   Wagner ............................... 210/402
3,105,043  11/1963   Rich et al. ........................... 210/402

Primary Examiner—Ivars Cintins
Attorney, Agent, or Firm—Bucknam and Archer

[57] ABSTRACT

A filtering apparatus is used to continuously separate a large quantity of a substance such as a slurry, sludge or other suspension into a liquid component and a solid component in such a manner that the separated solid component is obtained as a cake in a semi-dried condition, and comprises a rotary drum including a perforated cylindrical member and a filter cloth provided on the outer peripheral surface. The drum is supported for rotation so that a portion thereof is immersed into the substance to be filtered. The pressure within the drum is reduced by a vacuum pump so that the liquid component of the substance is drawn into the drum through the portion thereof is immersed into the substance while the solid component of the substance is accumulated on the filter cloth of the rotating drum and is held as a cake thereon. The cake is continuously removed by a doctor blade in the portion of the drum which is exposed to the atmosphere.

7 Claims, 4 Drawing Figures

FILTERING APPARATUS

BACKGROUND OF INVENTION

The present invention relates to a filtering apparatus for separating a substance such as slurry, sludge or other suspension into a liquid component and a solid component in such a manner that the separated solid component is obtained as a cake in semi-dried condition.

In the chemical and pharmaceutical industries, filtering apparatuses of various types have been used to separate substances such as those mentioned above into a liquid component and a solid component. On the other hand, the construction industry requires a filtering apparatus which is capable of continuously dealing with a large quantity of slurry or sludge with high efficiency, but for this purpose it is impossible to utilize the known filtering apparatuses which have been used in the chemical and pharmaceutical industries because they cannot continuously filter a large quantity of slurry or sludge with high efficiency.

One type of known filtering apparatus is of suction type in which the substance to be filtered is dealt with under a suction force in order to improve the filtering efficiency. The known apparatus also makes use of a perforated filter plate on which a filter cloth is directly supported, the total area of the perforations accounting for only 4 to 5% of the total area of the filter plate. Since with the apparatus of this arrangement the filtering efficiency tends to gradually decrease as the filtered solid component accumulates on the filter plate, the known apparatus cannot be utilized to continuously deal with a large quantity of slurry or sludge. Furthermore, the arrangement has an inherently-limited filtering efficiency because the filter cloth is directly supported on the perforated filter plate having perforations equivalent to only 4 to 5% of full area of the plate.

Therefore, it is a primary object of this invention to provide a filtering apparatus of the suction type which can be utilized to continuously deal with a large quantity of slurry, sludge or other suspension for separating it into a liquid component and a solid component in such a manner that the separated solid component is obtained as a cake in a semi-dried condition.

Another object of this invention is to provide a filtering apparatus of the above-mentioned type in which the continuous-filtering operation can be performed at high efficiency.

A further object of this invention is to provide a filtering apparatus of the above-mentioned type in which the separated solid component can be obtained as a cake in a more highly-dried condition.

SUMMARY OF INVENTION

The foregoing and other objects can be accomplished by a novel filtering apparatus of the suction type in which a rotary drum is used to separate a substance such as slurry, sludge or other suspension into a liquid component and a solid component. The drum includes a cylindrical member having perforations formed on its outer peripheral surface and a filter medium such as a filter cloth provided on the outer surface of the cylindrical member, and is supported for rotation so that a portion thereof is immersed into the substance to be filtered, which is received in a vessel. Suction means is used to reduce the pressure within the drum so that during the rotational movement of the drum the liquid component of the substance is drawn into the drum through the portion thereof which is immersed into the substance received in the vessel while the solid component is accumulated on the filter medium of the rotating drum and is held as a cake thereon. The suction means causes air to pass into the drum through the portion thereof which is exposed to the atmosphere. The liquid component and air introduced into the drum are taken out from the drum by the suction means. In order to remove the cake held on the filter medium, there is used a scraping means such as a doctor blade, which may be adjustable to control the thickness of the cake to be taken off.

According to this arrangement, it is possible to continuously deal with a large quantity of slurry, sludge or other suspension to separate it into a liquid component and a solid component because during the rotational movement of the drum, a portion thereof from which the cake has been taken off by the scraping means is again immersed in the substance to be filtered so that the filtering operation cycle is continued. Also, as is apparent from the foregoing, since the air passes into the drum through the portion thereof which is exposed to the atmosphere, the cake held on such exposed portion is continuously subjected to a drying action by the air passing therethrough until it is taken off by the scraping means so that the separated solid component can be obtained as a well-dried cake.

In a preferable embodiment of this invention, the outer peripheral surface of the cylindrical member is formed to have a plurality of regularly disposed grooves arranged so that each adjacent pair of grooves has a crest portion formed therebetween. The filter medium, which may be a filter cloth, is stretched tautly across the crest portions and the perforations of the cylindrical member are provided in the grooves thereof. According to this arrangement, the filtering efficiency is considerably improved because essentially the full area of the filter medium serves as an effective filter surface. In one particular embodiment, the grooves and the crest portions are disposed on the outer surface of the cylindrical member in parallel with the longitudinal axis thereof. In another particular embodiment, the grooves and the crest portions are disposed on the outer surface of the cylindrical member so that they are perpendicular to the longitudinal axis of the cylindrical member. In a further particular embodiment, the grooves and the crest portions are disposed on the outer surface of the cylindrical member so that they lie obliquely to the longitudinal axis thereof.

Alternatively, the cylindrical member has a single groove defined on its outer peripheral surface, this single groove being disposed on the outer surface of the cylindrical member in the form of a screw thread so that a thread-like crest portion is formed along the groove. Similarly, the filter medium, e.g. a filter cloth, is stretched tautly across the thread-like crest portion and the perforations of the cylindrical member are provided in the groove thereof. In this case, the filtering efficiency is also improved for the same reason as mentioned above.

The above and other advantages of the invention will become more apparent from the following description and the accompanying drawings, in which.

Figure 1:
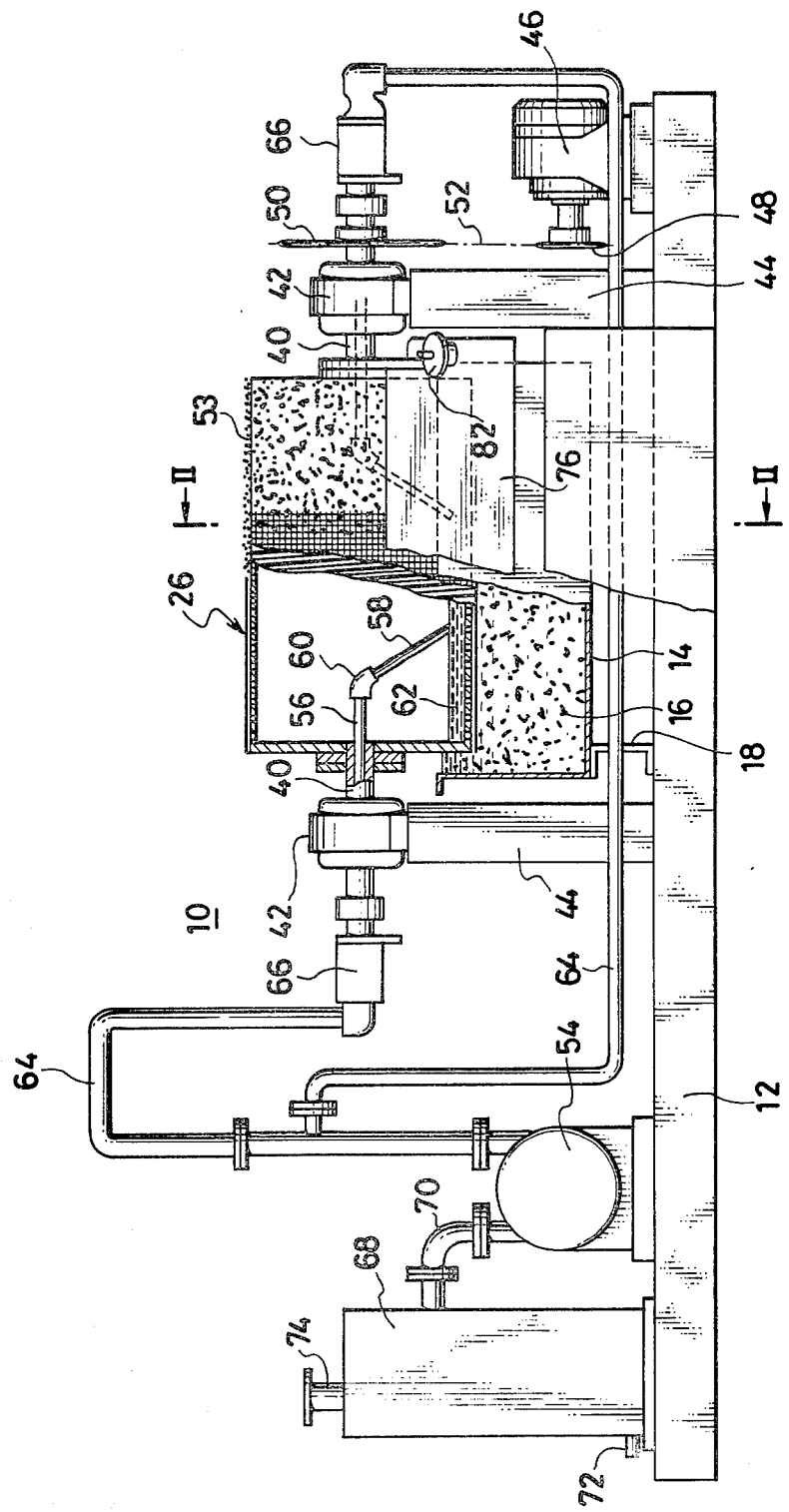
FIG. 1 is an elevational view of a filtering apparatus embodying this invention, which is partially cutaway to help explain the construction thereof.

Referring now to the drawings, and more particularly to FIG. 1, a filtering apparatus of the suction type in accordance with the invention is generally indicated by the reference numeral 10 and is installed on a base 12.

The apparatus 10 is used to continuously treat a large quantity of a substance such as a slurry, sludge or other suspension for separating it into a liquid component and a solid component in such a manner that the separated solid component is obtained as a cake in a semi-dried condition.

Figure 2:
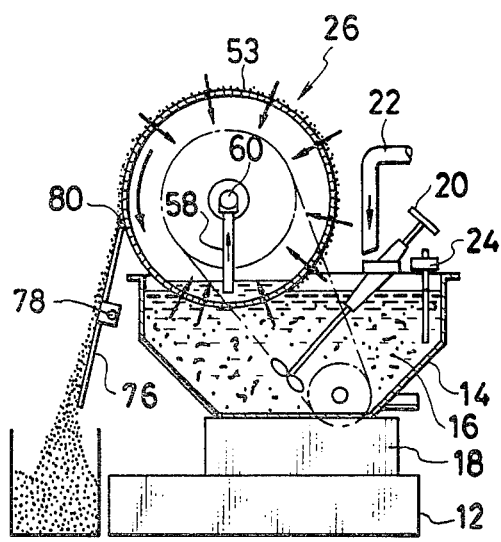
FIG. 2 is a transverse cross sectional view taken along the line II—II line of FIG. 1.

The apparatus 10 comprises a vessel 14 for receiving the substance 16 to be filtered. The vessel 14 is mounted on the base 12 by means of suitable supports 18 and is provided with an agitator 20 (FIG. 2) which can be used when the substance to be filtered exhibits precipitability. As shown in FIG. 2, the vessel 14 is supplied with the substance from a pipe 22 and is provided with a level detector 24 by which the substance received in the vessel 16 is maintained at a constant level.

Figure 3:
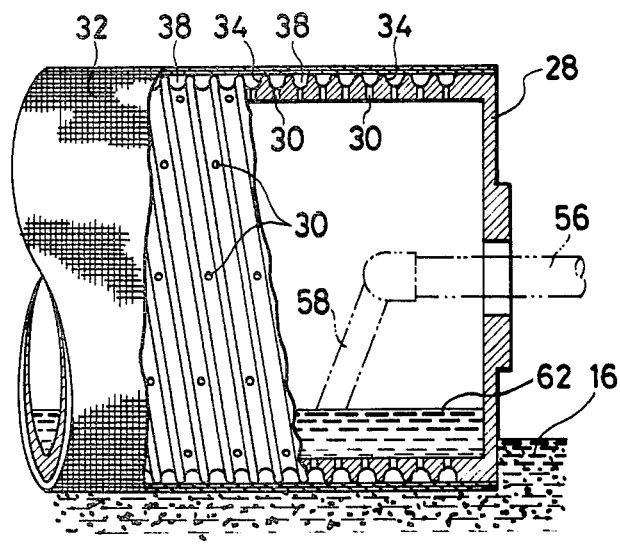
FIG. 3 is an enlarged portion longitudinal sectional view of the drum shown in FIGS. 1 and 2.
Figure 4:
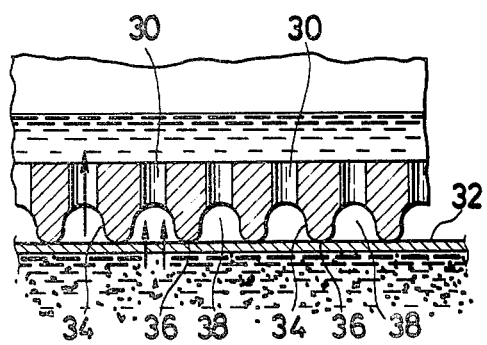
FIG. 4 is a further enlarged portion detail of FIG. 3.

The apparatus 10 also comprises a rotary drum 26 which is used to filter the substance received in the vessel 14. The drum 26 includes a cylindrical member 28 having perforations 30 formed on its outer peripheral surface and a filter medium such as a filter cloth 32 provided on the outer surface of the cylindrical member 28. In a preferable embodiment, the cylindrical member 28 has a plurality of grooves defined on its outer peripheral surface. These grooves are regularly disposed on the outer surface of the cylindrical member 28 so that a crest portion is formed between each pair of adjacent grooves. In the illustrated embodiment, such grooves and crest portions are indicated by the reference numerals 34 and 36, respectively, and are disposed on the outer surface of the cylindrical member 28 so that they lie obliquely to the longitudinal axis thereof, as best shown in FIG. 3. In this case, the filter cloth 32 is stretched tautly across the crest portions 36 so that the grooves 34 remain as a circular space 38 covered by the filter cloth 32, and the perforations 30 are positioned in the grooves 34, as best shown in FIG. 4. The grooves and the crest portions may be disposed on the outer surface of the cylindrical member in parallel with the longitudinal axis thereof. Furthermore, the grooves and the crest portions may be also disposed on the outer surface so that they are perpendicular to the longitudinal axis. In a modified embodiment, the cylindrical member has a single groove defined on its outer peripheral surface, which groove is disposed in the form of a screw thread so that a thread-like crest portion is formed along the groove. In this case, the filter cloth is also stretched tautly across the thread-like crest portion so that the groove remains as a thread-like space covered by the filter cloth, and the perforations of the cylindrical member are positioned in the groove thereof.

The drum 26 also includes two hollow shafts 40 which extend from opposite end walls of the cylindrical member 28 and which are supported by two bearings 42 provided at the end sides of the drum 26. Each of the bearings 42 is mounted on a corresponding support colum 44 fixed on the base 12. In this arrangement, the drum 26 is supported for rotation in such a manner that a portion thereof is immersed into the substance 16 received in the vessel 14. The drum 26 is rotated by suitable driving means such as an electrical motor 46 fixed on the base 12 and the rotational movement can be transmitted from the motor 46 to the drum 26 by use of suitable means which, for example, may consist of toothed wheels 48 and 50, mounted one on the shaft of the motor 46 and the other on the hollow shaft 40 at one end, and a driving chain 52 entrained thereon, as shown in FIG. 1.

The apparatus 10 further comprises suction means for reducing the pressure within the drum 26 so that during the rotational movement of the drum 26 the liquid component is drawn into the drum 26 through the portion thereof which is immersed into the substance 16 received in the vessel 14 while the solid component of the substance is continuously accumulated on the filter cloth 32 of the rotating drum 26 and is held as a cake thereon. The suction means causes air to pass into the drum 26 through the portion thereof which is exposed to the atmosphere. The suction means also functions to take off the introduced liquid component and air from the drum 26. For this purpose, the suction means includes a vacuum source or a vacuum pump 54 mounted on the base 12 and a piping system for connecting the vacuum pump 54 and the drum 26. The piping system includes two pipe sections 56 inserted one into each of the hollow shafts 40 and extended into the drum 26 from the corresponding end wall thereof, two suction tubes 58 connected one to the inner end of each pipe section 56 by a coupling 60 and extending therefrom toward a pool 62 of the liquid component introduced into the drum, and two pipes 64 each extending from the intake port of the vacuum pump 54 to the outer end of one of the pipe sections 56 inserted into the hollow shafts 40. Each pipe 64 is coupled to the corresponding hollow shaft 40 by means of a rotary joint 66 and is in communication with the pipe section 56 inserted into the corresponding hollow shaft 40. In the illustrated embodiment, the outlet port of the vacuum pump 54 is connected to a separator 68 mounted on the base 12 through a pipe 70. The separator 68 has two exhaust ports 72 and 74 and is used to separate the liquid component and the air which are taken out from the drum 26 by the suction means and which are exhausted from the vacuum pump 54. The separated liquid component and air are exhausted from the ports 72 and 74, respectively.

The apparatus 10 further comprises scraping means for taking off the cake 53 held on the filter cloth 32 of the rotating drum 26. The scraping means includes a doctor blade 76 which is provided at the descending side of the rotating drum, that is, at the side that the exposed portion of the rotating drum moves toward the immersed portion thereof. The doctor blade 76 is pivotally mounted on a rod 78 (FIG. 2) which, for example, is horizontally supported by the support columns 44. As shown in FIG. 2, the doctor blade 76 has a knife edge 80 and is positioned so that the knife edge 80 is engaged with the cake held on the cloth filter of the rotating drum 26 at the descending side thereof to remove it therefrom. In order to adjust the position of the doctor blade in relation to the drum 26 so as to control the thickness of the cake to be taken off, the doctor blade 76 can be provided with an adjusting means 82 by which it is pivoted at the rod 78 and is set in position.

The operation is as follows:

When the pressure within the drum 26 is reduced by the vacuum pump 54, the liquid component of the substance 16 is drawn into the drum 26 through the portion thereof which is immersed into the substance 16. More strictly speaking, in the immersed portion of the drum 26, the liquid component of the substance 16 is drawn into the filter cloth 32, the annular spaces 38 and the perforations 30, as indicated by the arrows of the FIG. 4. At the same time the solid component of the substance 16 is accumulated on the filter cloth 32 under the suction effect and is held as a cake thereon. Such cake is continuously produced as the drum 26 is rotated, and is then exposed to the atmosphere.

The cake held on the exposed portion of the drum 26 is continuously subjected to a drying action by the air passing therethrough and is then removed from the drum 26 by the doctor blade 76. The portion of the drum 26 from which the cake is removed is again immersed into the substance 16 so that the cycle of filtering operation is continued. The liquid component and air which have been introduced into the drum 26 are taken out therefrom through the piping system of the suction means.

As discussed above, according to this invention, it is possible to continuously treat a large quantity of a substance such as slurry, sludge or other suspension at high efficiency for separating it into a liquid component and a solid component in such a manner that the separated solid component is obtained as a cake in a semi-dried condition.

While a preferred embodiment of the invention has been described using specific terms, such description is for illustrative purposes only, and it should be understood that changes and variations may be made without departing from the spirit or scope of the following claims.

What is claimed is:

1. A filtering apparatus for continuously separating a substance such as slurry, sludge or other suspension into a liquid component and a solid component in such manner that the solid component is obtained in a semi-dried condition, said apparatus comprising:
   a vessel for receiving the substance to be filtered;
   a rotary drum including a cylindrical member having a plurality of grooves defined on its outer peripheral surface and perforations formed in said grooves, and a filter medium provided on the outer surface of said cylindrical member, said drum being supported for rotation so that a portion thereof is immersed into the substance received in said vessel;
   said grooves being regularly and closely disposed to form a crest portion between each adjacent pair of grooves and said filter medium being a filter cloth which is stretched tautly across said crest portions whereby the full area of the filter cloth can essentially serve as an effective filter surface;
   driving means for rotating said drum;
   suction means for reducing the pressure within said drum so that during the rotational movement of said drum the liquid component of said substance is drawn into said drum through the portion thereof which is immersed into said substance while the solid component of said substance continuously accumulates on the filter medium of said rotating drum and is held as a cake thereon, said suction means also causing air to pass into said drum through the portion thereof which is exposed to the atmosphere whereby the solid component held by the drum can be obtained as a cake in a more highly-dried condition, the liquid component and air introduced into said drum being taken out therefrom; and
   scraping means for removing said cake held on the filter medium of said drum.

2. An apparatus set forth in claim 1, wherein said grooves and said crest portions are disposed on the outer surface of said cylindrical member in parallel with the longitudinal axis thereof.

3. An apparatus set forth in claim 1, wherein said grooves and said crest portions are disposed on the outer surface of said cylindrical member perpendicularly to the longitudinal axis thereof.

4. An apparatus set forth in claim 1, wherein said grooves and said crest portions are disposed on the outer surface of said cylindrical member obliquely to the longitudinal axis thereof.

5. An apparatus set forth in claim 1, wherein said scraping means includes an adjustable doctor blade for controlling the thickness of the cake to be removed.

6. A filtering apparatus for continuously separating a substance such as slurry, sludge or other suspension into a liquid component and a solid component in such manner that the solid component is obtained in a semi-dried condition, said apparatus comprising:
   a vessel for receiving the substance to be filtered;
   a rotary drum including a cylindrical member having a single groove defined on its outer peripheral surface and perforations formed in said groove, and a filter medium provided on the outer surface of said cylindrical member, said drum being supported for rotation so that a portion thereof is immersed into substance received in said vessel;
   said groove being disposed in the form of a screw thread so that a thread-like crest portion is formed along said groove and said filter medium being a filter cloth which is stretched tautly across said thread-like crest portion whereby the full area of the filter cloth can essentially serve as an effective filter surface;
   driving means for rotating said drum;
   suction means for reducing the pressure within said drum so that during the rotational movement of said drum the liquid component of said substance is drawn into said drum through the portion thereof which is immersed into said substance while the solid component of said substance continuously accumulates on the filter medium of said rotating drum and is held as a cake thereon, said suction means also causing air to pass into said drum through the portion thereof which is exposed to the atmosphere whereby the solid component held by said drum can be obtained as a cake in a more highly-dried condition, the liquid component and air introduced into said drum being taken out therefrom; and
   scraping means for removing said cake held on the filter medium of said drum.

7. An apparatus set forth in claim 6, wherein said scraping means includes an adjustable doctor blade for controlling the thickness of the cake to be removed.

* * * * *